(12) United States Patent  (10) Patent No.: US 7,944,996 B2
Tsukio et al.  (45) Date of Patent: May 17, 2011

(54) OFDM RECEPTION DEVICE AND OFDM RECEIVER USING THE SAME

(75) Inventors: Yasunobu Tsukio, Osaka (JP); Hiroaki Ozeki, Osaka (JP); Sigeru Soga, Hyogo (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/066,403

(22) PCT Filed: May 30, 2007

(86) PCT No.: PCT/JP2007/060967
  § 371 (c)(1),
  (2), (4) Date: Mar. 11, 2008

(87) PCT Pub. No.: WO2007/142091
  PCT Pub. Date: Dec. 13, 2007

(65) Prior Publication Data
  US 2009/0074092 A1  Mar. 19, 2009

(30) Foreign Application Priority Data

Jun. 7, 2006  (JP) ................................ 2006-158187
  Sep. 6, 2006  (JP) ................................ 2006-240992

(51) Int. Cl.
  *H03K 9/00*  (2006.01)
  *H04L 27/00*  (2006.01)
(52) U.S. Cl. ........ 375/316; 375/346; 375/347; 375/349; 370/206
(58) Field of Classification Search .......... 375/259–260, 375/285, 316, 346, 349, 347, 350; 370/203, 370/206
  See application file for complete search history.

(56) References Cited

U.S. PATENT DOCUMENTS

| 6,128,355 | A  | * | 10/2000 | Backman et al. | ............. | 375/347 |
| 6,292,510 | B1 | * | 9/2001  | Kakura et al.  | ................ | 375/230 |
| 6,487,259 | B1 | * | 11/2002 | Russo          | ............ | 375/341 |
| 6,850,481 | B2 | * | 2/2005  | Wu et al.      | ....................... | 370/208 |

(Continued)

FOREIGN PATENT DOCUMENTS

CN  1543103 A  11/2004

(Continued)

OTHER PUBLICATIONS

International Search Report for PCT/JP2007/060967, dated Aug. 14, 2007.

(Continued)

*Primary Examiner* — Jean B Corrielus
(74) *Attorney, Agent, or Firm* — RatnerPrestia

(57) ABSTRACT

An OFDM reception device includes: a first channel estimation unit for estimating a channel distortion by using a signal that is supplied from the reception unit and has a first time interval; a second channel estimation unit for estimating a channel distortion by using a signal that is supplied from the reception unit and has a second time interval shorter than the first time interval; a selection unit for selecting and outputting one of a signal from the first channel estimation unit and a signal from the second channel estimation unit, according to a control signal from the control unit; and a correction unit for correcting a reception signal supplied from the reception unit, according to the channel estimation signal from the selection unit. The control unit determines the control signal to be supplied to the selection unit, according a reception state of the reception unit.

22 Claims, 14 Drawing Sheets

U.S. PATENT DOCUMENTS

| | | | | |
|---|---|---|---|---|
| 6,888,878 | B2 * | 5/2005 | Prysby et al. | 375/148 |
| 6,940,932 | B2 * | 9/2005 | Henriksson | 375/347 |
| 7,117,016 | B2 * | 10/2006 | Kisigami et al. | 455/562.1 |
| 7,310,503 | B2 * | 12/2007 | Ido | 455/140 |
| 7,436,757 | B1 * | 10/2008 | Wilson et al. | 370/203 |
| 7,610,024 | B2 * | 10/2009 | Laroia et al. | 455/101 |
| 7,630,450 | B2 * | 12/2009 | Duncan | 375/260 |
| 7,643,588 | B2 * | 1/2010 | Visalli et al. | 375/346 |
| 7,656,958 | B2 * | 2/2010 | Lo et al. | 375/260 |
| 7,672,383 | B2 * | 3/2010 | Namgoong et al. | 375/260 |
| 7,684,476 | B2 * | 3/2010 | Fujii et al. | 375/221 |
| 7,729,433 | B2 * | 6/2010 | Jalloul et al. | 375/260 |
| 7,764,939 | B2 * | 7/2010 | Yang | 455/277.1 |
| 2003/0012308 | A1 * | 1/2003 | Sampath et al. | 375/340 |
| 2004/0218682 | A1 | 11/2004 | Nam et al. | |
| 2006/0212773 | A1 * | 9/2006 | Aytur et al. | 714/755 |
| 2007/0110140 | A1 * | 5/2007 | Howard et al. | 375/150 |
| 2009/0016468 | A1 * | 1/2009 | Ghazi-Moghadam et al. | 375/340 |
| 2009/0180563 | A1 * | 7/2009 | Schmidl et al. | 375/260 |
| 2010/0135425 | A1 * | 6/2010 | Lo et al. | 375/260 |

FOREIGN PATENT DOCUMENTS

| | | |
|---|---|---|
| JP | 2004-282613 A | 10/2004 |
| JP | 2005-064581 A | 3/2005 |
| JP | 2005-160033 A | 6/2005 |
| JP | 2005-260331 A | 9/2005 |
| JP | 2005-286636 A | 10/2005 |
| WO | WO 2005/048546 A2 | 5/2005 |

OTHER PUBLICATIONS

Noritaka Iguchi et al., "Channel Estimation using Diagonal Interpolation in Digital Terrestrial Broadcasting Receiver", 2005 Communication Society Conference of the Institute of Electronics, Information and Communication Engineers (IEICE).

Chinese Office Action for Application No. 200780001384.7, Jan. 19, 2011, Panasonic Corporation.

Dong, J et al., "Optimal Pilot Interval Design for Linear Interpolated Channel Estimation," Dec. 2004, Journal of Beijing University of Posts and Telecommunications, vol. 27 Sup., pp. 207-211, (with English abstract).

* cited by examiner

OFDM RECEPTION DEVICE AND OFDM RECEIVER USING THE SAME

This application is a U.S. national phase application of PCT international application PCT/JP2007/060967.

TECHNICAL FIELD

The present invention relates to an orthogonal frequency division multiplexing (hereinafter abbreviated as "OFDM") reception device that receives an OFDM signal and estimates channel characteristics to improve reception performance, and to an OFDM receiver using the OFDM reception device.

BACKGROUND ART

Recently, digital terrestrial broadcasting using an OFDM modulation method has been started.

However, the reception system of a portable terminal receives broadcasting using a small antenna. Thus, the small antenna must receive signals in a lower position from the ground surface than a large household antenna in a fixed reception system for household use. In addition, because the user of the portable terminal receives broadcasting while moving, the reception environment is drastically degraded in the reception system of the portable terminal. In particular, it is necessary to restore the signal waveforms at transmission from the signal waveforms received in a poor reception environment that includes frequency-selective channel distortions resulting from multipath and fading resulting from moving reception, and to reproduce the broadcasted programs.

Conventionally, it has been known that a channel correction technology is effective in such a poor reception environment.

The channel correction technology estimates the waveform distortions produced in a channel and eliminates the distortions in reception signals, for correction. In the digital broadcasting, pilot signals known by both transmission and reception sides are arranged at predetermined intervals in the frequency-axis direction and in the time-axis direction. Thus, a reception device calculates changes in amplitude and the amount of phase rotation from the differences between the pilot signals received and the pilot signals generated inside of the receiver, to clarify the waveform distortions and time variations produced in the channel. Therefore, interpolation based on this information allows estimation and correction of the waveform distortions and time variations in the data signal positions other than the pilot signals, thus improving multipath tolerance and fading tolerance.

For example, Non-Patent Document 1 is known as the information on a conventional art of the present invention.

In the channel estimation using pilot signals, the reception characteristics greatly vary with the positions of the pilot signals to be used for estimation. For example, between a channel estimation using pilot signals spaced at first intervals in the time-axis direction (symbol direction) and a channel estimation using pilot signals spaced at second intervals shorter than the first intervals, the accuracy of estimating time variations and frequency-selective distortions in the reception signal is different. Such a difference varies the multipath tolerance and fading tolerance of the OFDM reception device.

Conventionally, either one of these channel estimation techniques has been used for interpolation. Thus, achievement of both multipath tolerance and fading tolerance at the same time has been difficult.

[Non-patent Document 1] Noritaka Iguchi, Ryosuke Mori, Akira Kisoda, and Ippei Kanno, "Channel Estimation using Diagonal Interpolation in Digital Terrestrial Broadcasting Receiver", The Institute of Electronics, Information, and Communication Engineers Conference Collected Papers, vol. 2005, Society 1, 531 pp

SUMMARY OF THE INVENTION

An OFDM reception device includes: a reception unit for receiving an OFDM signal; a first channel estimation unit for estimating a channel distortion by using a signal that is supplied from the reception unit and has a first time interval; a second channel estimation unit for estimating a channel distortion by using a signal that is supplied from the reception unit and has a second time interval shorter than the first time interval; and a control unit for outputting a control signal based on a reception state of the reception unit. The OFDM reception device further includes a selection unit for selecting and outputting one of a channel estimation signal from the first channel estimation unit and a channel estimation signal from the second channel estimation unit, according to the control signal; and a correction unit for correcting a reception signal supplied from the reception unit, according to the channel estimation signal from the selection unit.

With this structure, the OFDM reception device uses a channel estimation technique providing high multipath tolerance for the first channel estimation unit, and a channel estimation technique providing high fading tolerance for the second channel estimation unit. Correction by selectively using the result based on one of the estimation techniques according to the reception state of the reception unit in this manner can achieve both fading tolerance and multipath tolerance at the same time.

An OFDM reception device includes: a first reception unit for receiving an OFDM signal; a first channel correction unit connected to the first reception unit; a second reception unit for receiving an OFDM signal; a second channel correction unit connected to the second reception unit; and a diversity unit connected to the first channel correction unit and the second channel correction unit. Further, the first channel correction unit estimates a channel distortion by using a signal that is supplied from the first reception unit and has a first time interval, to correct a reception signal supplied from the first reception unit. The second channel correction unit estimates a channel distortion by using a signal that is supplied from the second reception unit and has a second time interval shorter than the first interval, to correct a reception signal supplied from the second reception unit.

With this structure, the OFDM reception device uses a channel estimation technique providing high fading tolerance for the first channel correction unit, and a channel estimation technique providing high multipath tolerance for the second channel correction unit, for correction. Thus, diversity synthesis of the respective output signals can achieve both fading tolerance and multipath tolerance at the same time.

Figure 1:
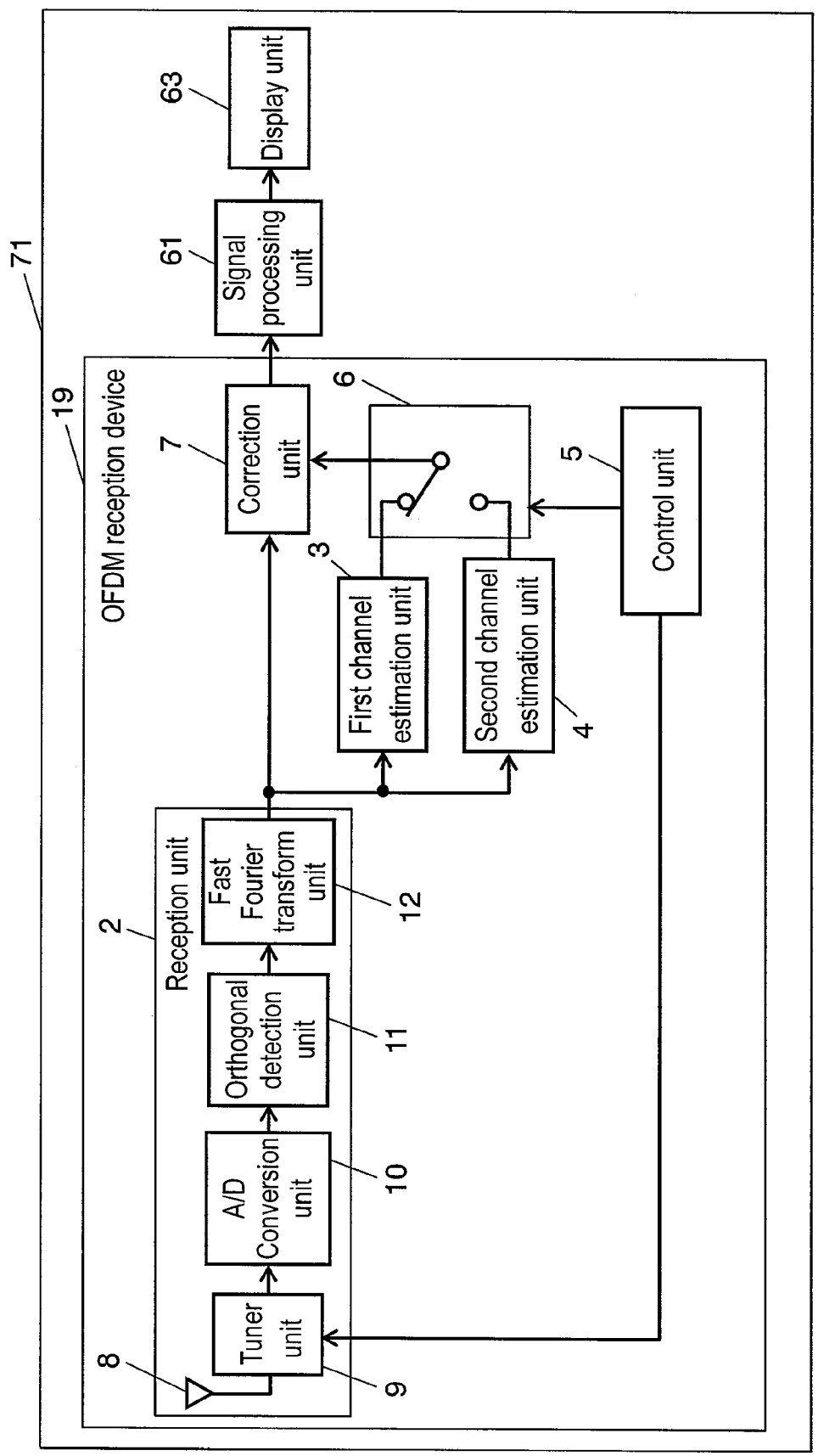
FIG. 1 is a block diagram of an OFDM receiver in accordance with a first exemplary embodiment of the present invention.

REFERENCE MARKS IN THE DRAWINGS 2, 302 Reception unit
3, 207 First channel estimation unit
4, 209 Second channel estimation unit
5, 211 Control unit
6 Selection unit
7, 208, 210 Correction unit
8 Antenna
9 Tuner unit
10 A/D conversion unit
11 Orthogonal detection unit
12 Fast Fourier transform unit
13 Reception level detection unit
14 Fading frequency estimation unit
15 Signal quality measurement unit
19, 21, 31, 35, 219, 221, 231, 233, 241, 254 OFDM reception device
34, 259 N-th channel estimation unit
61, 261 Signal processing unit
63, 263 Display unit
71, 271, 273 OFDM receiver
202 First reception unit
204 Second reception unit
203 First channel correction unit
205 Second channel correction unit
206, 226 Diversity unit
208, 210, 260 Correction unit
212 Enabling circuit
213 Signal selection unit
214 Error correction unit
215 Error rate measurement unit
251 N-th reception unit
253 N-th channel correction unit
255 CN ratio measurement unit

DETAILED DESCRIPTION OF PREFERRED EMBODIMENTS

Exemplary embodiments of the present invention are described hereinafter with reference to the accompanying drawings.

First Exemplary Embodiment

The first exemplary embodiment of the present invention is described hereinafter with reference to FIGS. 1 through 4. FIG. 1 is a block diagram of OFDM receiver 71 in accordance with the first exemplary embodiment of the present invention. As shown in FIG. 1, OFDM reception device 19 includes reception unit 2 for receiving an OFDM signal, first channel estimation unit 3 for estimating a channel distortion by using a signal that is supplied from reception unit 2 and has a first time interval, and second channel estimation unit 4 for estimating a channel distortion by using a signal that is supplied from reception unit 2 and has a second time interval shorter than the first time interval. OFDM reception device 19 further includes selection unit 6 for selecting and outputting either one of a channel estimation signal from first channel estimation unit 3 and a channel estimation signal from second channel estimation unit 4, according to a control signal from control unit 5. Further, OFDM reception device 19 includes correction unit 7 for correcting a reception signal supplied from reception unit 2, according to the channel estimation signal from selection unit 6.

Reception unit 2 further includes antenna 8 for receiving an OFDM signal transmitted as a high-frequency signal, and tuner unit 9 for converting the high-frequency signal received by antenna 8 into an intermediate-frequency signal. Reception unit 2 further includes A/D conversion unit 10 for converting the intermediate-frequency signal, i.e. an analog signal supplied from tuner unit 9, into a digital signal; and orthogonal detection unit 11 for performing orthogonal detection on the digital signal supplied from A/D conversion unit 10. Reception unit 2 further includes fast Fourier transform unit 12 for performing digital Fourier transform on the signal supplied from orthogonal detection unit 11 to convert a time-axis signal into a frequency-axis signal.

Control unit 5 is connected to tuner unit 9, and sets the frequency of the OFDM signal to be received by reception unit 2. The control unit outputs a control signal for controlling selection unit 6 according to the reception state of reception unit 2. Control unit 5 may have a part of controlling tuner unit 9 and a part of controlling selection unit 6 so that these parts communicate with each other as required. The method of outputting the control signal is described later. OFDM receiver 71 incorporating OFDM reception device 19 includes signal processing unit 61 connected to the output side of correction unit 7 and display unit 63 connected to the output side of signal processing unit 61.

Figure 2:
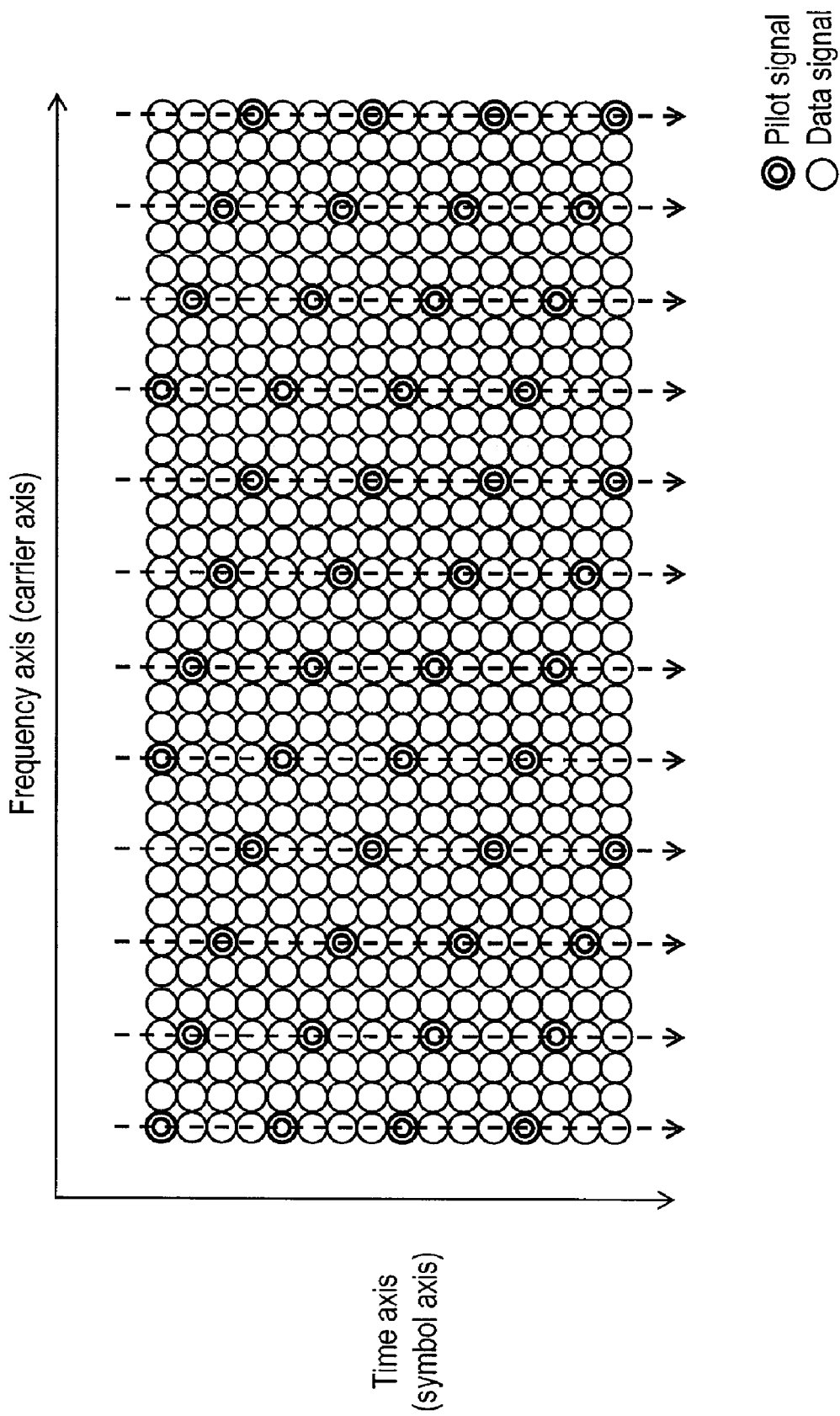
FIG. 2 is an explanatory view of time-axis interpolation in accordance with the first exemplary embodiment.

Next, a description is provided of techniques how first channel estimation unit 3 and second channel estimation unit 4 estimate a channel distortion by using pilot signals in OFDM signals, with reference to the accompanying drawings. FIG. 2 shows the arrangement of OFDM signals. The positions of the pilot signals in FIG. 2 are only an example, and the present invention is not limited to this signal arrangement. Pilot signals are arranged in the positions shown by the double circles. Data signals are arranged in the positions shown by the white circles. The pilot signals are known by both transmit and reception sides. Thus, OFDM reception device 19 can correct the data signals by channel estimation using the received pilot signals. Some techniques of channel estimation are provided as follows.

Figure 3:
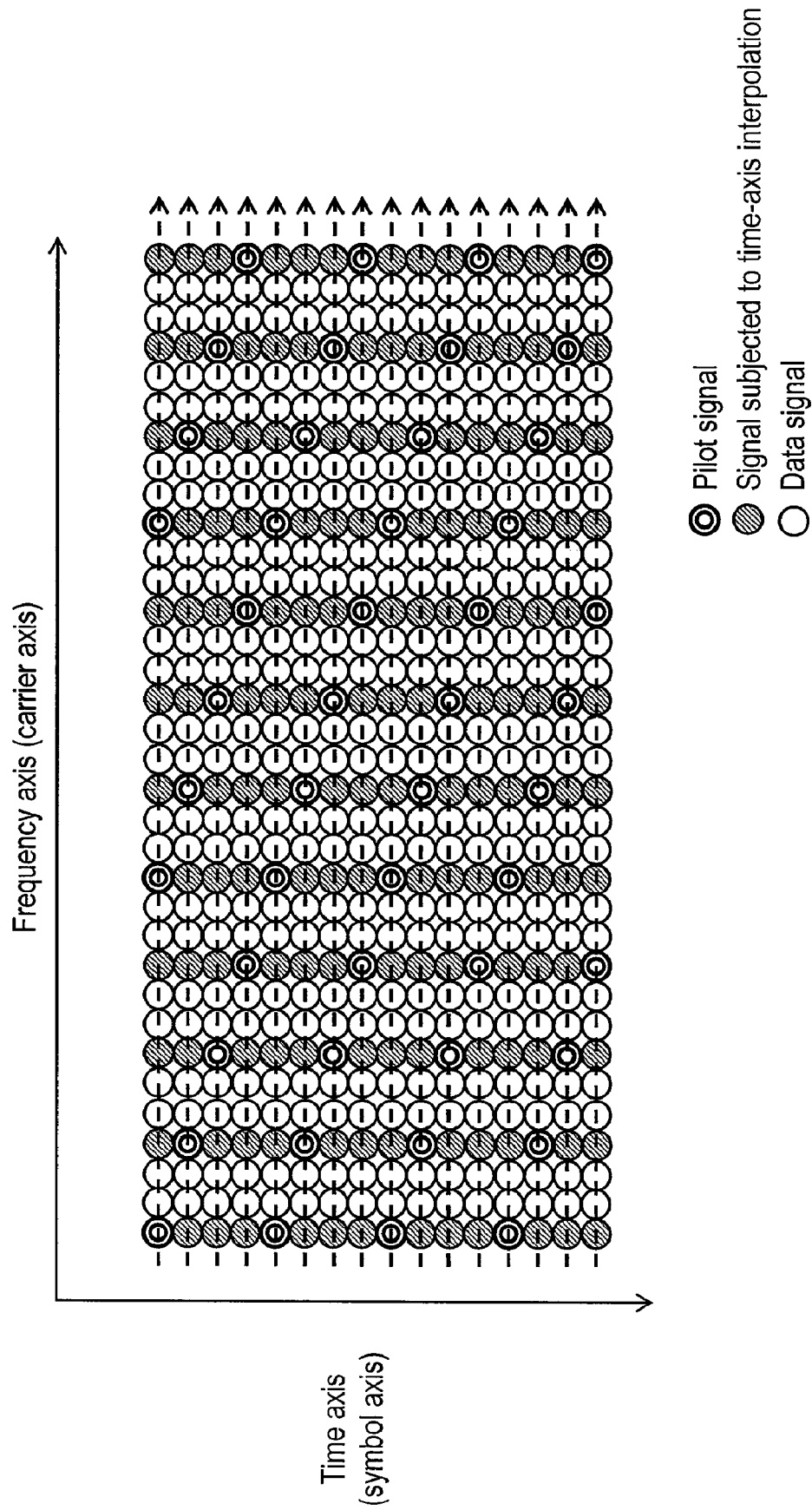
FIG. 3 is an explanatory view of frequency-axis interpolation in accordance with the first exemplary embodiment.

A first technique performs time-axis interpolation first. The time-axis interpolation is described with reference to FIG. 2. As shown by the dotted arrows in FIG. 2, using pilot signals arranged in one carrier in the time-axis direction, the data signals arranged between the pilot signals are interpolated. In FIG. 3, the signals subjected to such time-axis compensation are shown by the diagonally shaded circles. In the frequency-axis direction, as shown by the dotted arrows in FIG. 3, the pilot signals and the signals subjected to time-axis interpolation are provided every three carriers in each symbol. Next, the first technique performs frequency-axis interpolation. In other words, interpolation is performed in the frequency-axis direction (shown by the dotted arrows) using these pilot signals and signals subjected to time-axis interpolation. As a result, the remaining data shown by the white circles are compensated. Thus, the channel estimation values (not shown) can be obtained for all the data signals.

Figure 4:
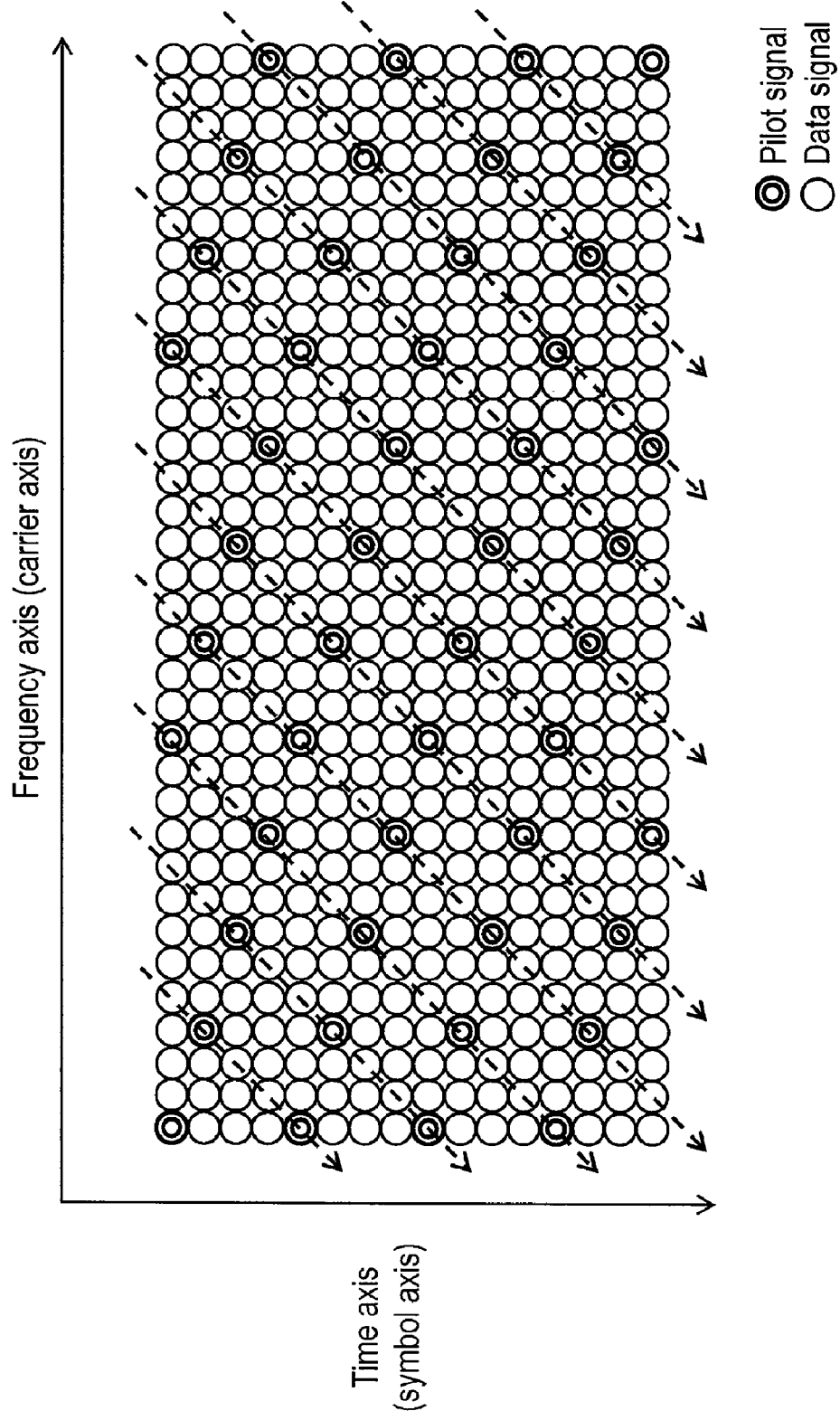
FIG. 4 is an explanatory view of diagonal interpolation in accordance with the first exemplary embodiment.
Figure 5:
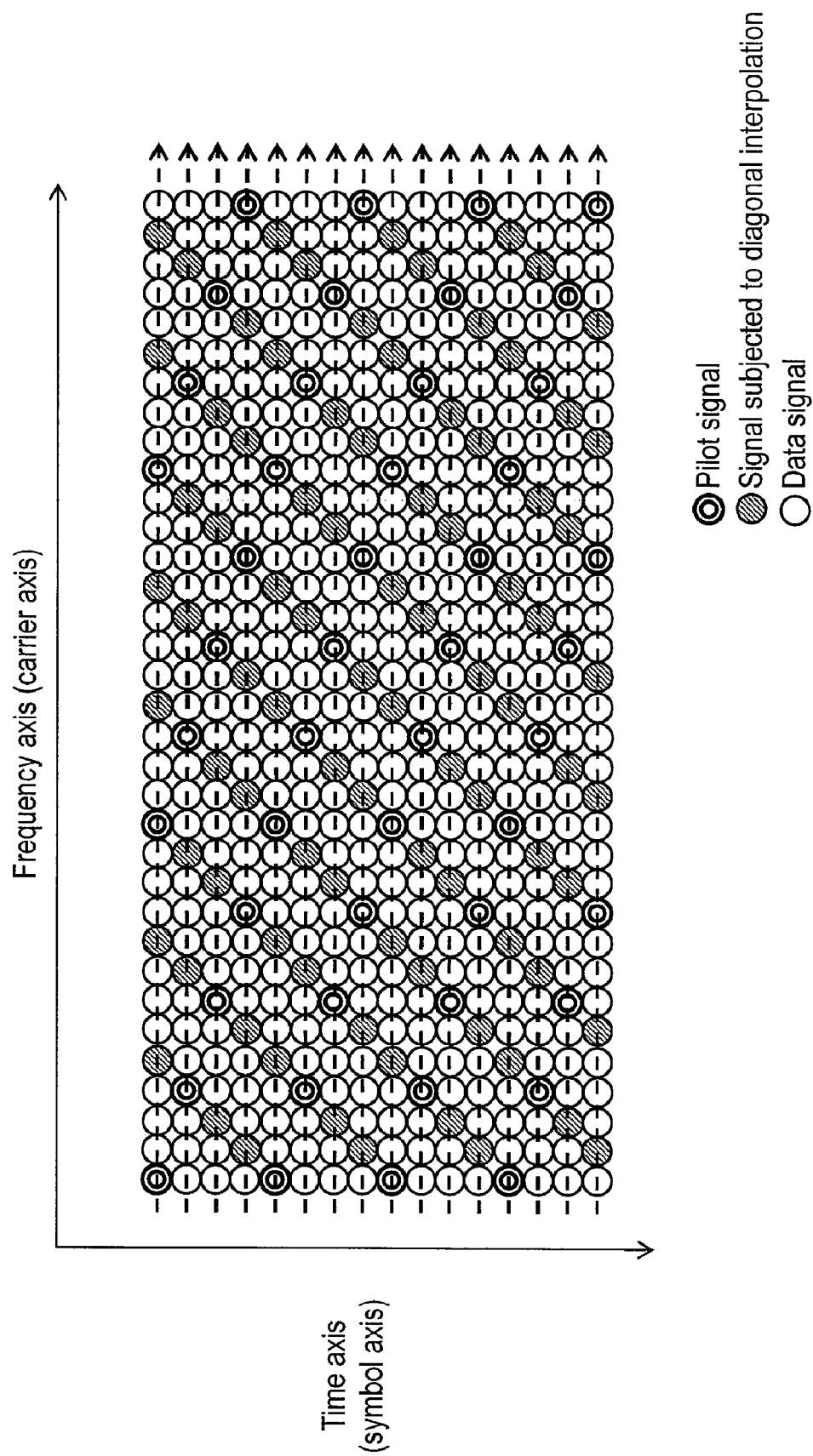
FIG. 5 is an explanatory view of frequency-axis interpolation in accordance with the first exemplary embodiment.

A second technique performs interpolation in the diagonal direction first, as shown by the dotted arrows in FIG. 4. The signals subjected to such diagonal compensation are shown by the diagonally shaded circles in FIG. 5. As shown by the dotted arrows in FIG. 5, the pilot signals and the signals subjected to diagonal interpolation are provided in each symbol. Next, the second technique performs frequency-axis interpolation. In other words, interpolation is performed in the frequency-axis direction (shown by the dotted arrows) using these pilot signals and signals subjected to diagonal interpolation. As a result, the remaining data shown by the white circles are compensated. Thus, the channel estimation values (not shown) can be obtained for all the data signals.

Now, the first technique and the second technique are compared with each other. The first technique uses pilot signals arranged at first time intervals, i.e. every four symbols, in the time-axis direction, for interpolation. In contrast, the second technique uses pilot signals arranged at second time intervals, i.e. every three symbols, in the diagonal direction, for interpolation. Thus, the second technique provides more excellent capability of following time variations, and more improved fading tolerance.

In the frequency-axis direction, the first technique uses the pilot signals or signals subjected to time-axis interpolation that are arranged every three carriers, while the second technique uses the pilot signals or signals subjected to diagonal interpolation that are arranged every four carriers. Thus, the first technique is better at frequency-selective distortions and provides more improved multipath tolerance.

In this manner, first channel estimation unit 3 outputs the result estimated by using the first technique. Second channel estimation unit 4 outputs the result estimated by using the second technique. Then, according to the reception state of reception unit 2, control unit 5 outputs a control signal for selecting first channel estimation unit 3 when large frequency-selective distortions degrade the quality of the reception signal. When large time variations degrade the quality of the reception signal, the control unit outputs a control signal for selecting second channel estimation unit 4. According to the control signal from control unit 5, selection unit 6 selects and outputs either one of these channel estimation signals. Correction unit 7 corrects the reception signal supplied from reception unit 2 by using the channel estimation signal supplied from selection unit 6. Thus, the optimum channel estimation technique for the reception state is selected, and both multipath tolerance and fading tolerance can be achieved at the same time.

Simple control methods in control unit 5 include a method of selecting a channel estimation technique according to the frequency of a high-frequency signal to be received. Hereinafter, a description is provided of this method. The maximum traveling velocity of OFDM reception device 19 at which signals can be received is closely correlated with the velocity of variations in the reception signal with time, i.e. a fading frequency. Assume that the reception frequency is fc, the maximum fading frequency at which signals can be received is fdmax, and the velocity of light is c. Then, maximum traveling velocity vmax of OFDM reception device 19 at which signals can be received is expressed by:

$$v\text{max} = \frac{fd\text{max}}{fc}c. \qquad \text{[Equation 1]}$$

In other words, reception frequency fc is inversely proportional to maximum traveling velocity vmax of OFDM reception device 19. Assume that the maximum fading frequency at which signals can be received using the first technique is fdmax1, and the maximum fading frequency at which signals can be received using the second technique is fdmax2 (>fdmax1). For the first technique, signals can be received at a reception frequency up to predetermined value fc_t1 that are expressed by:

$$\text{fc\_t1} = \frac{c}{v\text{max}}fd\text{max1}. \qquad \text{[Equation 2]}$$

For the second technique, signals can be received at a reception frequency up to predetermined value fc_t2 that are expressed by:

$$\text{fc\_t2} = \frac{c}{v\text{max}}fd\text{max2}. \qquad \text{[Equation 3]}$$

As shown by Equation 2 and Equation 3, fc_t1 and fc_t2 can be obtained by using maximum fading frequencies fdmax1 and fdmax2, respectively, together with maximum traveling velocity vmax of OFDM reception device 19. At this time, a relation of fc_t1<fc_t2 holds. As described above, the first technique provides higher multipath tolerance. Thus, control unit 5 can make control so that first channel estimation unit 3 for channel estimation using the first technique is selected when the reception frequency is lower than fc_t1. The control unit can make control so that second channel estimation unit 4 for channel estimation using the second technique is selected when the reception frequency is equal to or higher than fc_t1. This selection can ensure the desired mobile reception performance in a wide reception frequency range. Further, at a low reception frequency, multipath tolerance can be ensured. For example, in applications where the maximum traveling velocity of OFDM reception device 19 is known, such as on-vehicle reception, selection of first channel estimation unit 3 at a low value of reception frequency fc can improve the multipath tolerance.

The channel estimation technique may be changed in each of first channel estimation unit 3 and second channel estimation unit 4, according to reception frequency fc. In other words, control such that the first time interval and the second time interval are switched according to reception frequency fc can further achieve both fading tolerance and multipath tolerance at the same time.

Various kinds of channel estimation techniques are proposed. For some systems, an estimation technique without using pilot signals is studied to increase the amount of data transmission. Even in such systems, the OFDM reception method of the present invention offers effective advantages.

Second Exemplary Embodiment

Figure 6:
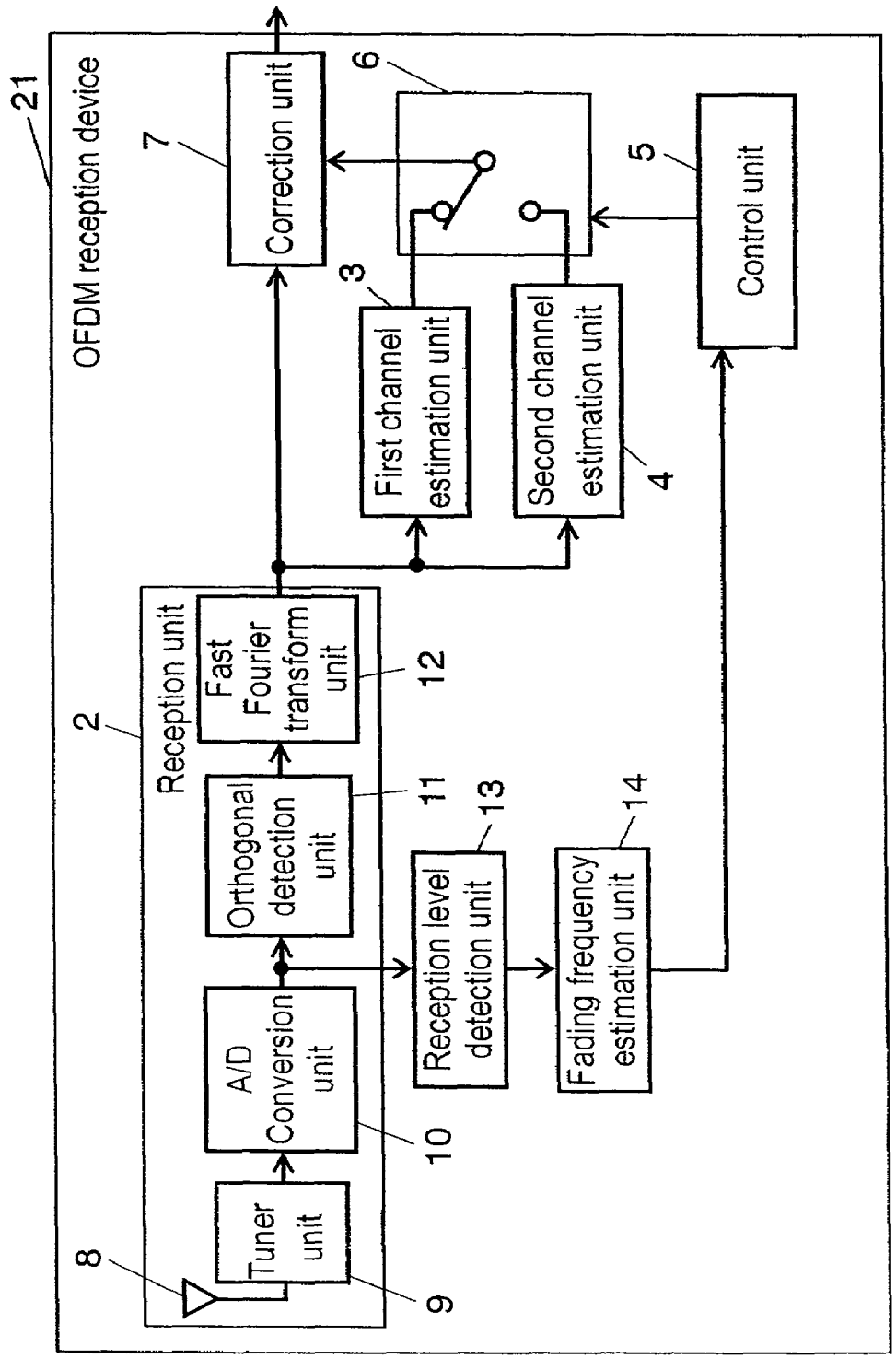
FIG. 6 is a block diagram of an OFDM reception device in accordance with a second exemplary embodiment of the present invention.

The second exemplary embodiment of the present invention is described hereinafter with reference to FIG. 6. FIG. 6 is a block diagram of OFDM reception device 21 in accordance with the second exemplary embodiment of the present invention. Elements similar to those in the first exemplary embodiment have the same reference marks. The descriptions of those elements are omitted and the differences are detailed. With reference to FIG. 6, in addition to the elements of FIG. 1, OFDM reception device 21 further includes reception level detection unit 13 that is connected between A/D conversion unit 10 and orthogonal detection unit 11 of reception unit 2 and detects the signal level of a reception signal, and fading frequency estimation unit 14 that is connected to reception level detecting unit 13 and estimates the fading frequency of the reception signal.

In this structure, control unit 5 outputs a control signal for selecting the input signal from first channel estimation unit 3, to selection unit 6, when the fading frequency supplied from fading frequency estimation unit 14 is lower than a predetermined value. When the fading frequency supplied from fading frequency estimation unit 14 is equal to or higher than the predetermined value, control is made so that a control signal for selecting the input signal from second channel estimation unit 4 is supplied to selection unit 6. Fading frequencies up to approximately 100 Hz are expected at ordinary reception, for example. However, control unit 5 may be controlled with a predetermined value of the fading frequency set at approximately 80 Hz. As described in the first exemplary embodiment, when maximum traveling velocity vmax of OFDM reception device 19 is set, which one of first channel estimation unit 3 and second channel estimation unit 4 control unit 5 should select according to the reception frequency of reception unit 2 can be determined by using Equation 2 and Equation 3. Such a setting allows more adequate selection of either one of first channel estimation unit 3 and second channel estimation unit 4. Thus, both fading tolerance and multipath tolerance can be achieved at the same time. The fading tolerances vary by the improvement in the performance of the reception unit and the channel estimation technique. The present invention features the use of two channel estimation units having different characteristics. Thus, the present invention is not limited to this specific value.

The fading frequency estimation in fading frequency estimation unit 14 can be made by analysis of variations in the reception level with time. For example, the past reception level values are stored in a memory, and the distribution of the reception level values are calculated to estimate the fading frequency.

Third Exemplary Embodiment

Figure 7:
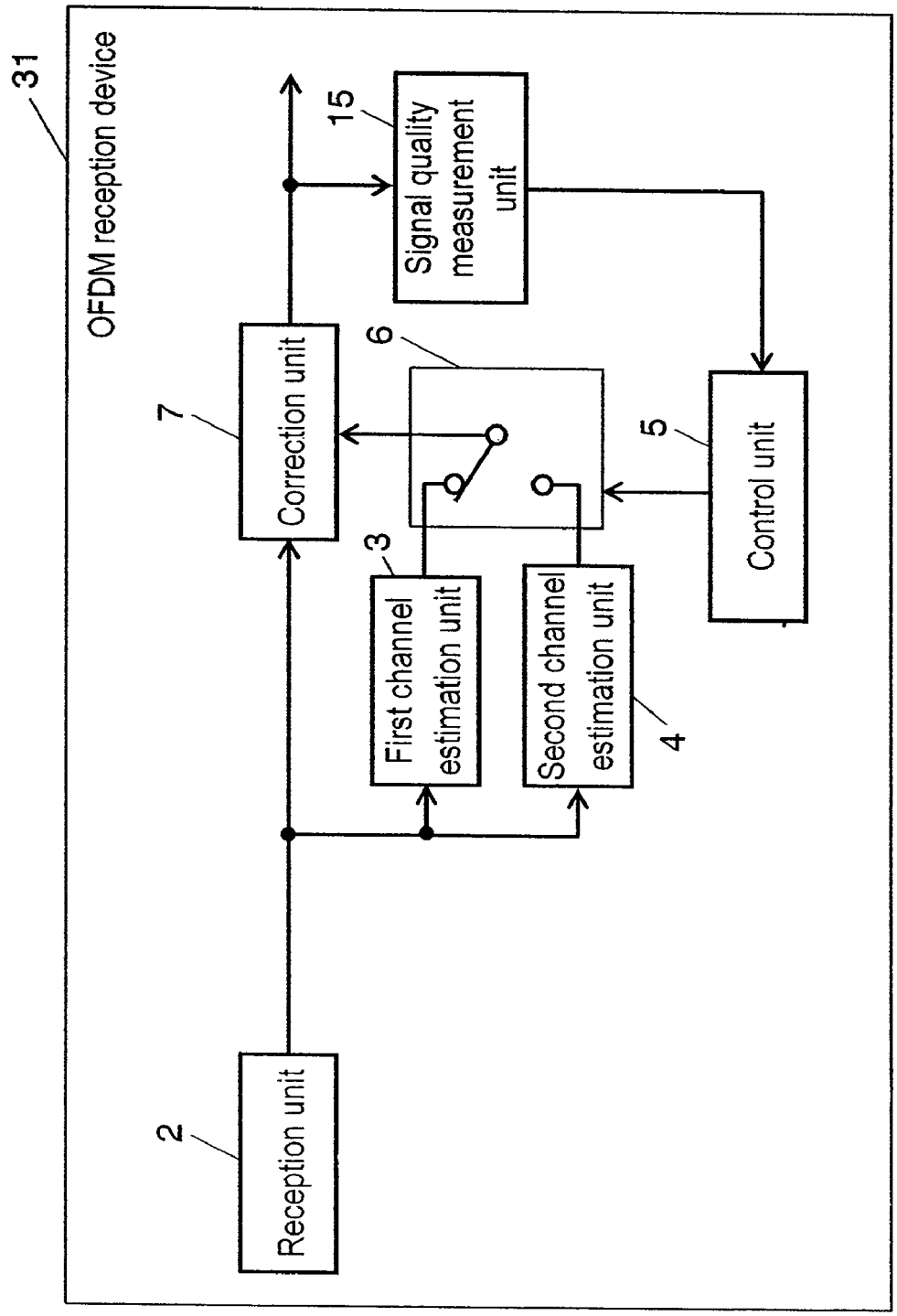
FIG. 7 is a block diagram of an OFDM reception device in accordance with a third exemplary embodiment of the present invention.

The third exemplary embodiment of the present invention is described hereinafter with reference to FIG. 7. FIG. 7 is a block diagram of OFDM reception device 31 in accordance with the third exemplary embodiment of the present invention. Elements similar to those in the first exemplary embodiment have the same reference marks. The descriptions of those elements are omitted and the differences are detailed. With reference to FIG. 7, in addition to the elements of FIG. 1, OFDM reception device 31 further includes signal quality measurement unit 15 that is connected to correction unit 7 and outputs the signal quality of a reception signal to control unit 5.

In this structure, control unit 5 outputs a control signal for causing selection unit 6 to select a signal from the other channel estimation unit, when the signal quality supplied from signal quality measurement unit 15 is lower than a predetermined value. Thus, both multipath tolerance and fading tolerance can be achieved at the same time.

For the signal quality in signal quality measurement unit 15, the ratio between the carrier level and noise level of a reception signal (hereinafter "CN ratio") can be used. In other words, when first channel estimation unit 3 is selected and the CN ratio is degraded to 10 dB or lower, it is possible that an increased traveling velocity has increased the fading frequency. Then, control unit 5 makes control so that second channel estimation unit 4 capable of providing higher fading tolerance is selected. On the other hand, when second channel estimation unit 4 is selected and the CN ratio is degraded to 10 dB or lower, it is possible that increased multipath distortions have increased the frequency-selective distortions. Then, control unit 5 makes control so that first channel estimation unit 3 capable of providing higher multipath tolerance is selected. With such control, an optimum channel estimation technique for the reception state can be selected, and both multipath tolerance and fading tolerance can be achieved at the same time.

As the signal quality of an OFDM signal in the third exemplary embodiment, a predetermined value of the CN ratio is set at 10 dB. The predetermined value may be changed as appropriate, according to the modulation parameter of the broadcasting system. Alternatively, the signal level or error rate of a reception signal may be used as the signal quality. The examples of the error rate include a bit error rate and a packet error rate. The predetermined value of the signal level of a reception signal as a signal quality may be set at −80 dBm, for example. The predetermined value of the bit error rate of a reception signal as a signal quality may be set at $2 \times 10^{-4}$, for example.

Further, when control unit 5 switches the channel estimation units, keeping the state of a control signal supplied to selection unit 6 for a fixed time period after the switching can further improve the characteristics. In other words, the estimation in the channel estimation units uses pilot signals having predetermined time intervals for interpolation. For this reason, when control unit 5 controls the switching of selection unit 6 in a cycle sufficiently larger than the time intervals, degradation of correction resulting from the switching is ignorable. Thus, the fixed time period can be set at 500 ms, for example. When control unit 5 switches the channel estimation units, the influence of the processing delay and measuring delay caused by the switching temporarily degrades the reliability of the signal quality measurement in approximately 500 ms after the switching. For this reason, keeping the state of a control signal supplied to selection unit 6 for a fixed time period can prevent the above influence. As described above, when control unit 5 makes switching control in a cycle that is not ignorable with respect to the time intervals, the reception quality in correction unit 7 is degraded by the switching. On the other hand, setting the smaller switching cycle improves the capability of following changes in reception environment. Thus, once a switching control is made, control unit 5 stops the control of selection unit 6 for a fixed time period so that the state of the control signal is kept. With this operation, a smaller switching cycle can be set, and the degradation of the reception quality resulting from the switching can be inhibited. The fixed time periods vary by the broadcasting system and processing method in the demodulation unit, and thus may be selected as appropriate.

Figure 8:
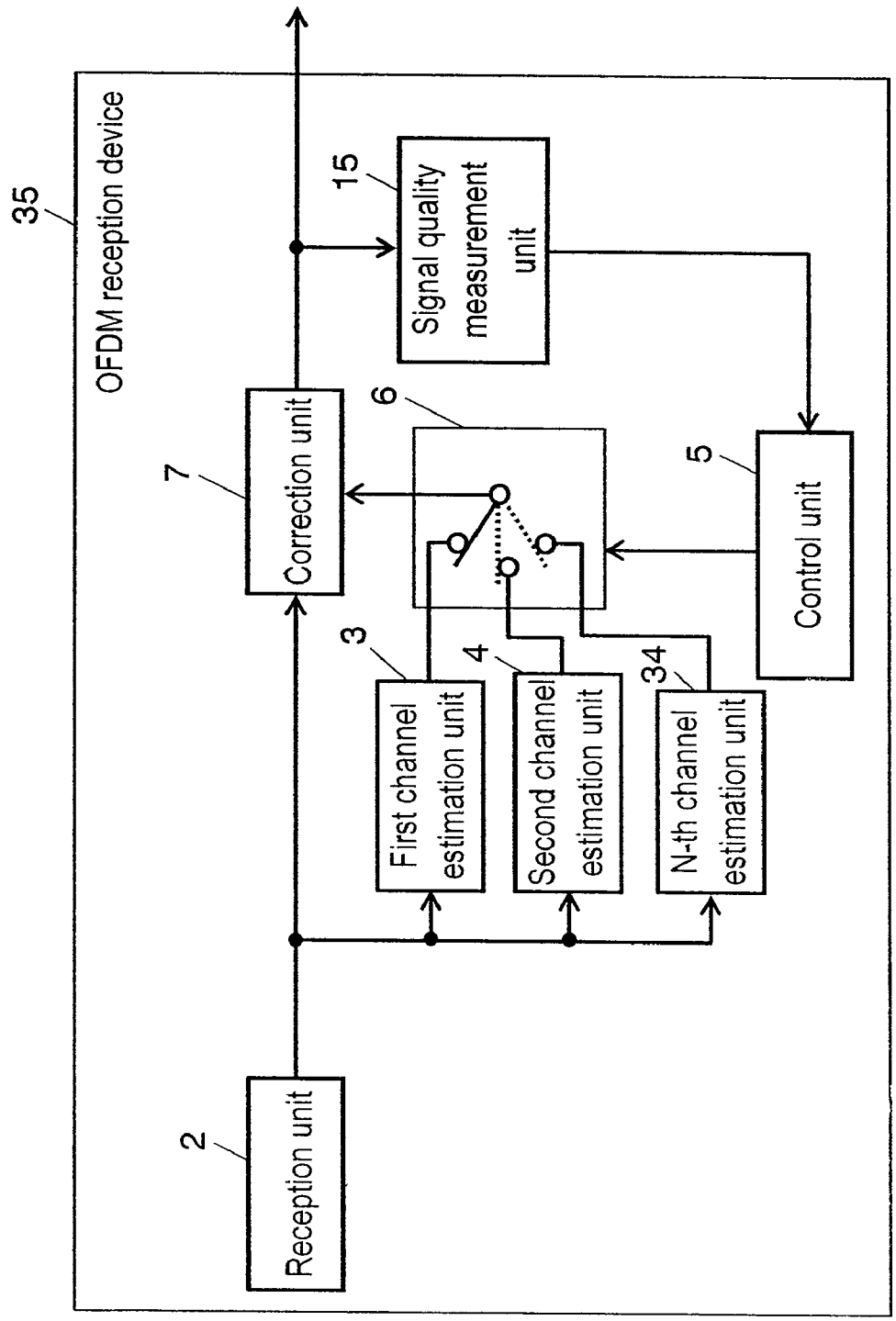
FIG. 8 is a block diagram of another example of the OFDM reception device in accordance with the third exemplary embodiment.

In the above description, two of first channel estimation unit 3 and second channel estimation unit 4 are used as different channel estimation units. However, as shown in FIG. 8, three or more different channel estimation units may be provided. FIG. 8 is a block diagram of another example of OFDM reception device 35 in accordance with the third exemplary embodiment. As shown in the drawing, OFDM reception device 35 includes N channel estimation units. The drawing shows only n-th channel estimation unit 34 instead of the third units and thereafter. Selection unit 6 makes correction by using the estimation result from any one of the respective n different channel estimation units, including two of first channel estimation unit 3 and second channel estimation unit 4. Thus, a plurality of, i.e. three or more, characteristics based on the characteristics of the channel estimation units can be achieved at the same time.

A description is provided of a case of including three channel estimation units, as an example. Assume that this case includes a third channel estimation unit (not shown) that makes channel estimation using a third time interval shorter than the time intervals used in first channel estimation unit 3 and second channel estimation unit 4. For example, when the fading frequency is equal to or higher than 150 Hz, correction is made by using the estimation result of the third channel estimation unit using the third time interval. When the fading frequency is 100 Hz or higher and lower than 150 Hz, correction is made by using the estimation result of second channel estimation unit 4 using the second time interval. When the fading frequency is lower than 100 Hz, correction is made by using the estimation result of first channel estimation unit 3 using the first time interval. With this operation, three estimation units can be selected and switched according to the signal quality, and thus finer control can be made.

Fourth Exemplary Embodiment

Figure 9:
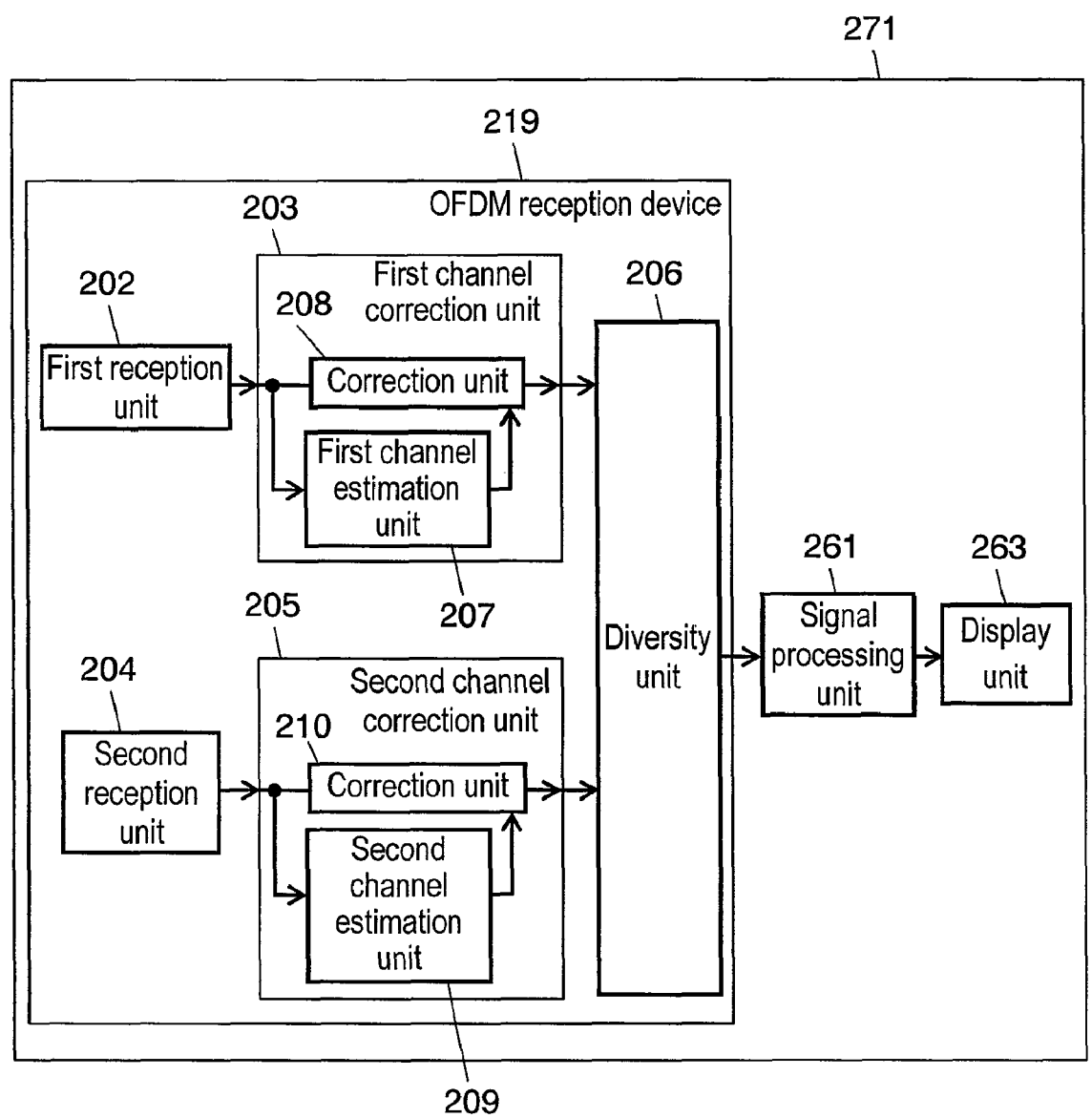
FIG. 9 is a block diagram of an OFDM receiver in accordance with a fourth exemplary embodiment of the present invention.

The fourth exemplary embodiment of the present invention is described hereinafter with reference to FIGS. 9 and 10. FIG. 9 is a block diagram of OFDM receiver 271 in accordance with the fourth exemplary embodiment of the present invention. As shown in FIG. 9, OFDM reception device 219 includes first reception unit 202 for receiving an OFDM signal, and first channel correction unit 203 connected to first reception unit 202. OFDM reception device 219 further includes second reception unit 204 for receiving an OFDM signal, and second channel correction unit 205 connected to second reception unit 204. First reception unit 202 and second reception unit 204 have similar structures and functions. OFDM reception device 219 further includes diversity unit 206 connected to first channel correction unit 203 and second channel correction unit 205. Each of first reception unit 202 and second reception unit 204 has a structure similar to that of reception unit 2 of FIG. 1 in the first exemplary embodiment. Each of these reception units includes a fast Fourier transform unit (not shown) for performing Fourier transform on a reception signal.

OFDM receiver 271 incorporating OFDM reception device 219 includes signal processing unit 261 connected to the output side of diversity unit 206, and display unit 263 connected to the output side of signal processing unit 261.

First channel correction unit 203 is composed of first channel estimation unit 207 for estimating the channel state from a reception signal supplied from first reception unit 202, and correction unit 208 for correcting a reception signal according to the estimation result of first channel estimation unit 207. Second channel correction unit 205 is composed of second channel estimation unit 209 for estimating the channel state from a reception signal supplied from second reception unit 204, and correction unit 210 for correcting a reception signal according to the estimation result of second channel estimation unit 209. First channel estimation unit 207 has a structure and function similar to those of first channel estimation unit 3 in the first exemplary embodiment. Similarly, second channel estimation unit 209 has a structure and function similar to those of second channel estimation unit 4 in the first exemplary embodiment. Thus, the detailed description of the equivalent parts is omitted.

In such a structure, first channel correction unit 203 makes channel estimation using a reception signal that is supplied from first reception unit 202 and has a first time interval. According to the result, correction unit 208 outputs the correction result to diversity unit 206. Second channel correction unit 205 makes channel estimation using a reception signal that is supplied from second reception unit 204 and has a second time interval shorter than the first interval. According to the result, correction unit 210 outputs the correction result to diversity unit 206. Further, diversity unit 206 synthesizes the input signals from first channel correction unit 203 and second channel correction unit 205, according to the respective signal qualities thereof calculated in a signal quality calculator (not shown) inside of diversity unit 206. For this synthesis, a synthesis ratio may be determined according to the ratio between the carrier level and noise level (C/N) of each output signal from first channel correction unit 203 and second channel correction unit 205. With this structure, first channel correction unit 203 can achieve multipath tolerance and second channel correction unit 205 can achieve fading tolerance at the same time. However, the synthesizing method is not limited to this method, and other methods may be used.

For a specific example including pilot signals, the channel distortion is estimated to correct the reception signals in a manner similar to the description with reference to FIGS. 2 through 5 in the first exemplary embodiment.

In other words, first channel correction unit 203 uses the first technique described in the first exemplary embodiment, and estimates the channel distortion by using pilot signals that are included in the reception signals supplied from first reception unit 202 and arranged at the first symbol intervals (every four symbols). The first channel correction unit corrects the reception signals supplied from first reception unit 202. Second channel correction unit 205 uses the second technique described in the first exemplary embodiment, and estimates the channel distortion by using pilot signals that are included in the reception signals supplied from second reception unit 204 and arranged at the second symbol intervals (every three symbols) shorter than the first intervals. The second channel correction unit corrects the reception signals supplied from second reception unit 204.

Thus, first channel correction unit 203 outputs a reception signal corrected according to the result estimated by first channel estimation unit 207 using the first technique. Second channel correction unit 205 outputs a reception signal corrected according to the result estimated by second channel estimation unit 209 using the second technique. Diversity unit 206 synthesizes the signals from these first channel correction unit 203 and second channel correction unit 205. Thus, multipath tolerance provided by the frequency-selective distortion characteristics of the first technique and fading tolerance provided by the time-following capability characteristics of the second technique can be achieved at the same time.

Figure 10:
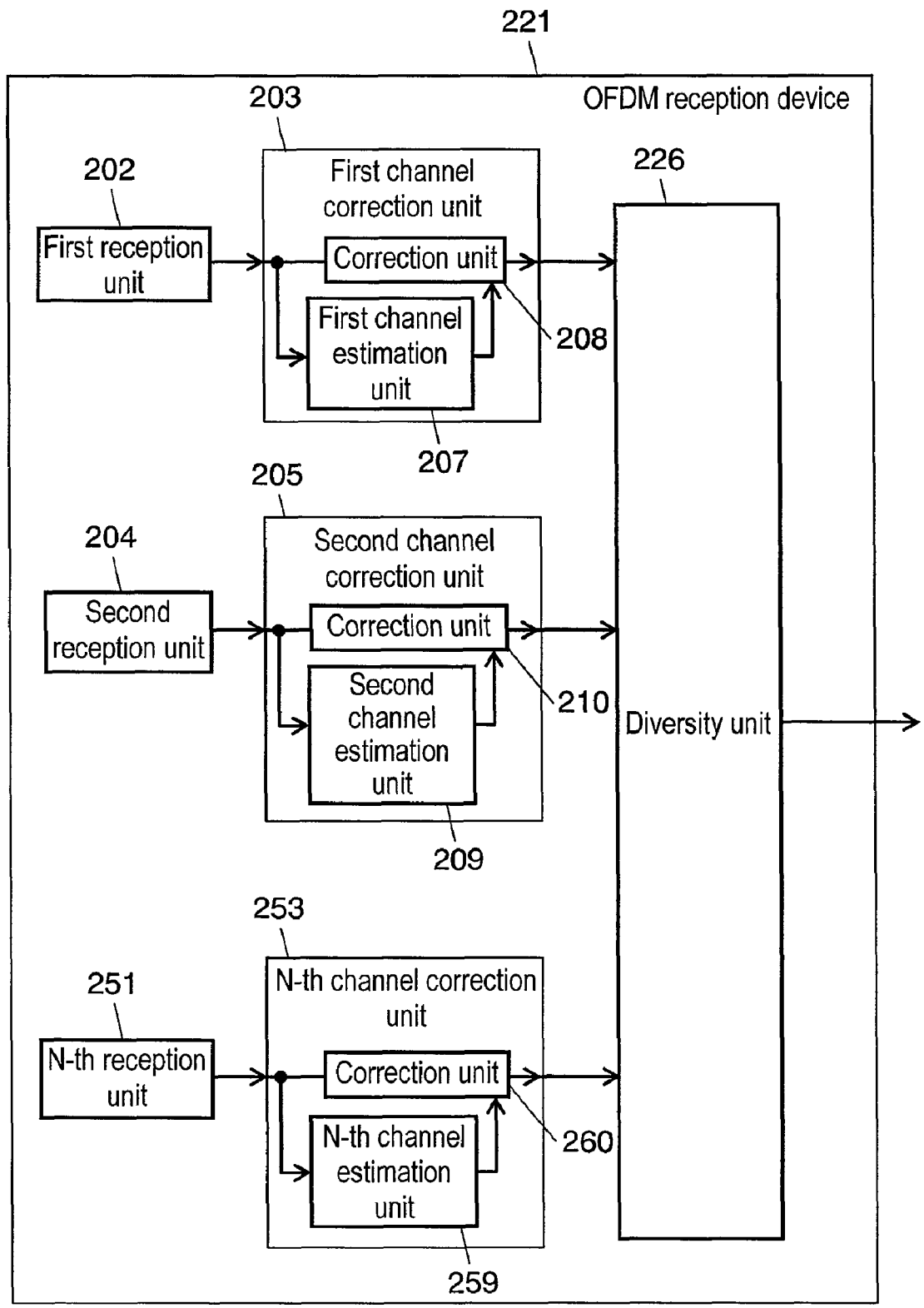
FIG. 10 is a block diagram of another example of the OFDM reception device in accordance with the fourth exemplary embodiment.

Further, as shown in FIG. 10, N (N=natural number) serial-connection assemblies each of which includes a reception unit and a channel correction unit may be provided in addition to the elements shown in FIG. 9. FIG. 10 is a block diagram of another example of OFDM reception device 221 in accordance with the fourth exemplary embodiment of the present invention. As shown in the drawing, OFDM reception unit 221 includes N assemblies each of which includes a reception unit and a channel correction unit serially connected. The drawing shows N-th reception unit 251 and N-th channel correction unit 253 in the n-th serial-connection assemblies instead of the third assemblies and thereafter. N-th channel correction unit 253 is composed of n-th channel estimation unit 259 for estimating the channel state from a reception signal supplied from n-th reception unit 251, and correction unit 260 for correcting a reception signal according to the estimation result of n-th channel estimation unit 259. Then, the respective channel correction units make correction by using different channel estimation techniques, and diversity unit 226 synthesizes the output therefrom. Thus, the advantage of further improving characteristics can be offered.

Various kinds of channel estimation techniques are proposed. For some systems, an estimation technique without using pilot signals is studied to increase the amount of data transmission. Even in such systems, the OFDM reception method of the present invention offers effective advantages.

Fifth Exemplary Embodiment

Figure 11:
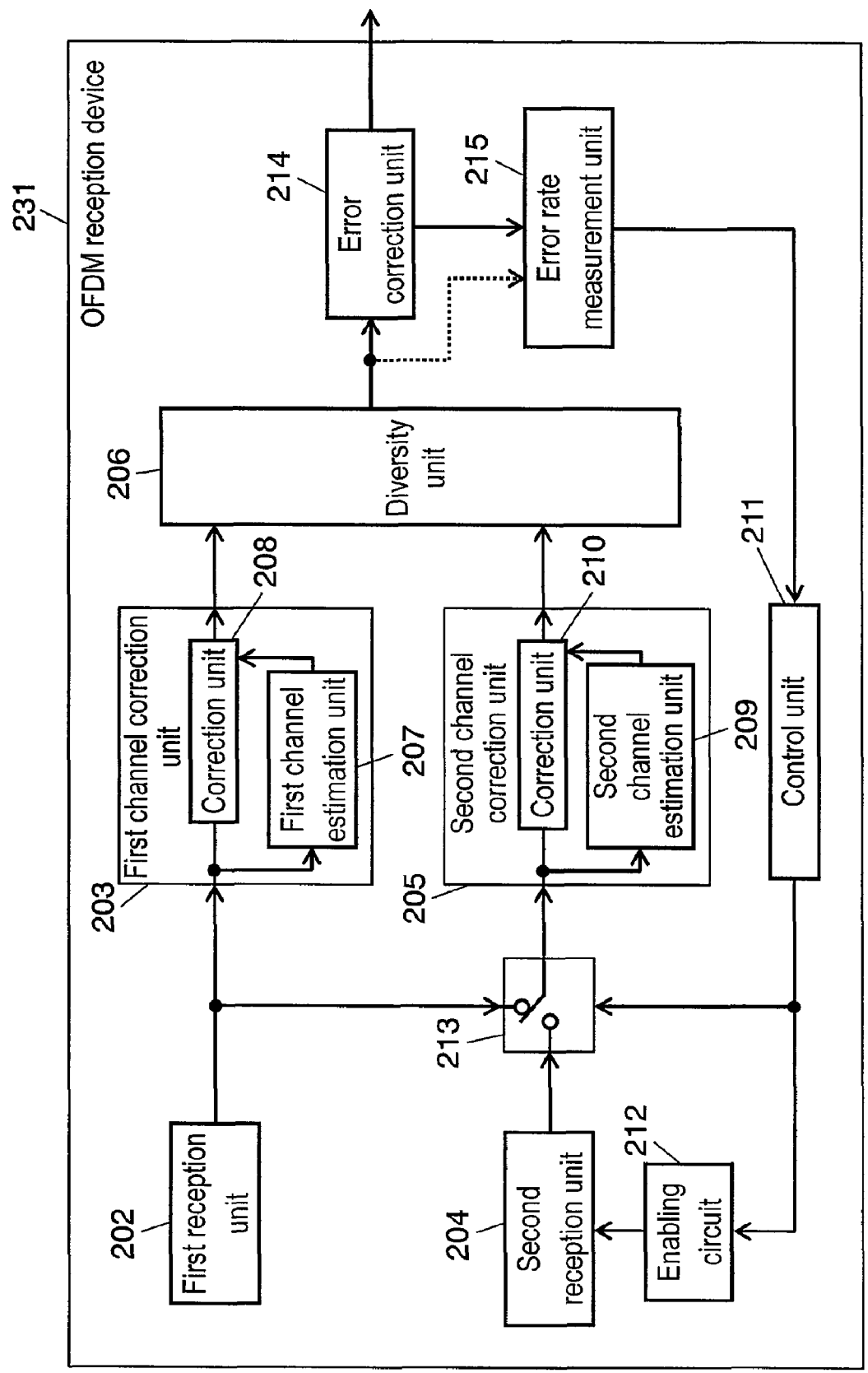
FIG. 11 is a block diagram of an OFDM reception device in accordance with a fifth exemplary embodiment of the present invention.

The fifth exemplary embodiment of the present invention is described hereinafter with reference to FIG. 11. FIG. 11 is a block diagram of OFDM reception device 231 in accordance with the fifth exemplary embodiment of the present invention. Elements similar to those in the fourth exemplary embodiment have the same reference marks. The descriptions of those elements are omitted and the differences are detailed. With reference to FIG. 11, in addition to the elements in FIG. 9, OFDM reception device 231 further includes control unit 211, and enabling circuit 212 for controlling second reception unit 204 according to a control signal supplied from control unit 211 so that the operation of the second reception unit is started or stopped. OFDM reception device 231 further includes signal selection unit 213 that is connected to first reception unit 202 and second reception unit 204, and outputs an input signal from either of first reception unit 202 and second reception unit 204, to second channel correction unit 205, according to a control signal supplied from control unit 211. Further, OFDM reception unit 231 includes error correction unit 214 connected to diversity unit 206, and error rate measurement unit 215 connected between error correction unit 214 and control unit 211. Alternatively, as shown by the dotted line in FIG. 11, error rate measurement unit 215 may be connected to diversity unit 206 and measure a CN ratio before error correction.

In this structure, control unit 211 outputs a control signal for stopping operation, to enabling circuit 212, and outputs a control signal for selecting the input signal from first reception unit 202, to signal selection unit 213, when the error rate measured by error rate measurement unit 215 is smaller than a predetermined value. When the error rate is equal to or larger than the predetermined value, control unit 211 makes control so that a control signal for starting operation is supplied to enabling circuit 212, and a control signal for selecting the input signal from second reception unit 204 is supplied to signal selection unit 213. The examples of the error rate include a bit error rate and a packet error rate. The predetermined value of the bit error rate of a reception signal may be set at $2 \times 10^{-4}$, for example.

With this control, when the reception environment is good and the error rate is smaller than the predetermined value, enabling circuit 212 stops the operation of second reception unit 204 to reduce power consumption. Signal selection unit 213 selects the input signal from first reception unit 202. Thus, not only first channel correction unit 203 corrects the signal received by first reception unit 202 but also second channel correction unit 205 corrects the signal using a different channel estimation technique. Then, the output signals from these first channel correction unit 203 and second channel correction unit 205 are synthesized in diversity unit 206. These operations can reduce power consumption and achieve both fading tolerance and multipath tolerance at the same time.

On the other hand, when the reception environment is poor and the error rate is equal to or larger than the predetermined value, second reception unit 204 starts operation and signal selection unit 213 selects the input signal from second reception unit 204 to improve reception sensitivity. In other words, the signals received by the respective antennas (not shown) in first reception unit 202 and second reception unit 204 are synthesized in diversity unit 206. When these two antennas have non-correlative noises, the reception sensitivity is improved. For example, the signals received by the respective antennas are non-correlative (the correlation coefficient being 0), the reception sensitivity is improved by 3 dB.

With the above control, OFDM reception device 231 of the fifth exemplary embodiment stops the operation of second reception unit 204 to reduce power consumption when the reception environment is good. Further, both first channel correction unit 203 and second channel correction unit 205 are used for correction, and thus the degradation of reception characteristics can be inhibited. When the reception environment is poor, starting the operation of second reception unit 204 can ensure the reception sensitivity characteristics.

Figure 12:
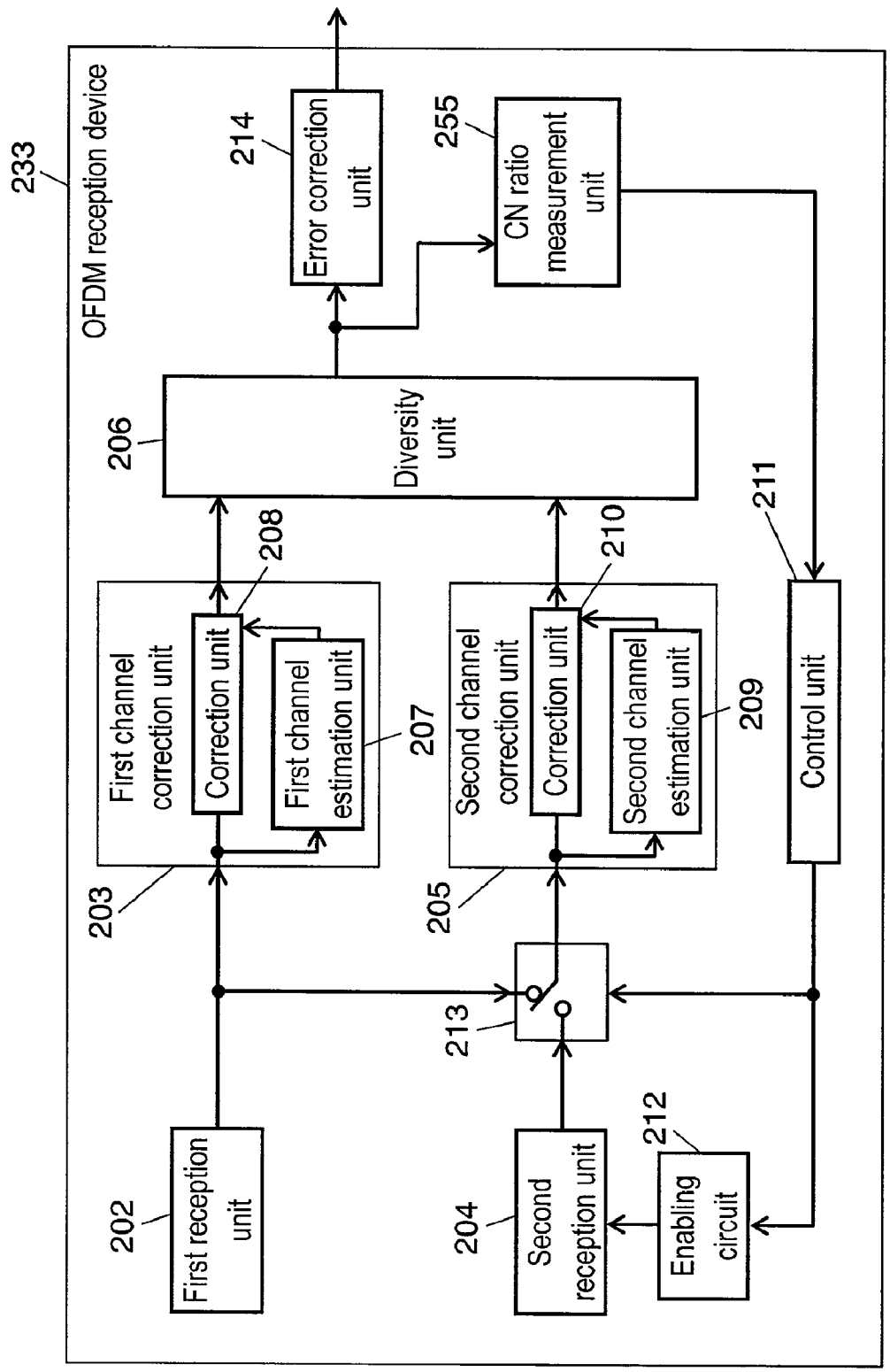
FIG. 12 is a block diagram of another example of the OFDM reception device in accordance with the fifth exemplary embodiment.

Control unit 211 may make control using an index showing a signal quality, such as a CN ratio, instead of the error rate. FIG. 12 is a block diagram of another example of OFDM reception device 233 in accordance with the fifth exemplary embodiment of the present invention. As shown in FIG. 12, OFDM reception device 233 includes CN ratio measurement unit 255 instead of error rate measurement unit 215 of FIG. 11. CN ratio measurement unit 255 can measure a CN ratio from the signal supplied from diversity unit 206. Making control using a CN ratio as an index showing the signal level in this manner can shorten the time necessary for detection of the signal quality. The predetermined value of the CN ratio of a reception signal may be set at 10 dB, for example.

Sixth Exemplary Embodiment

Figure 13:
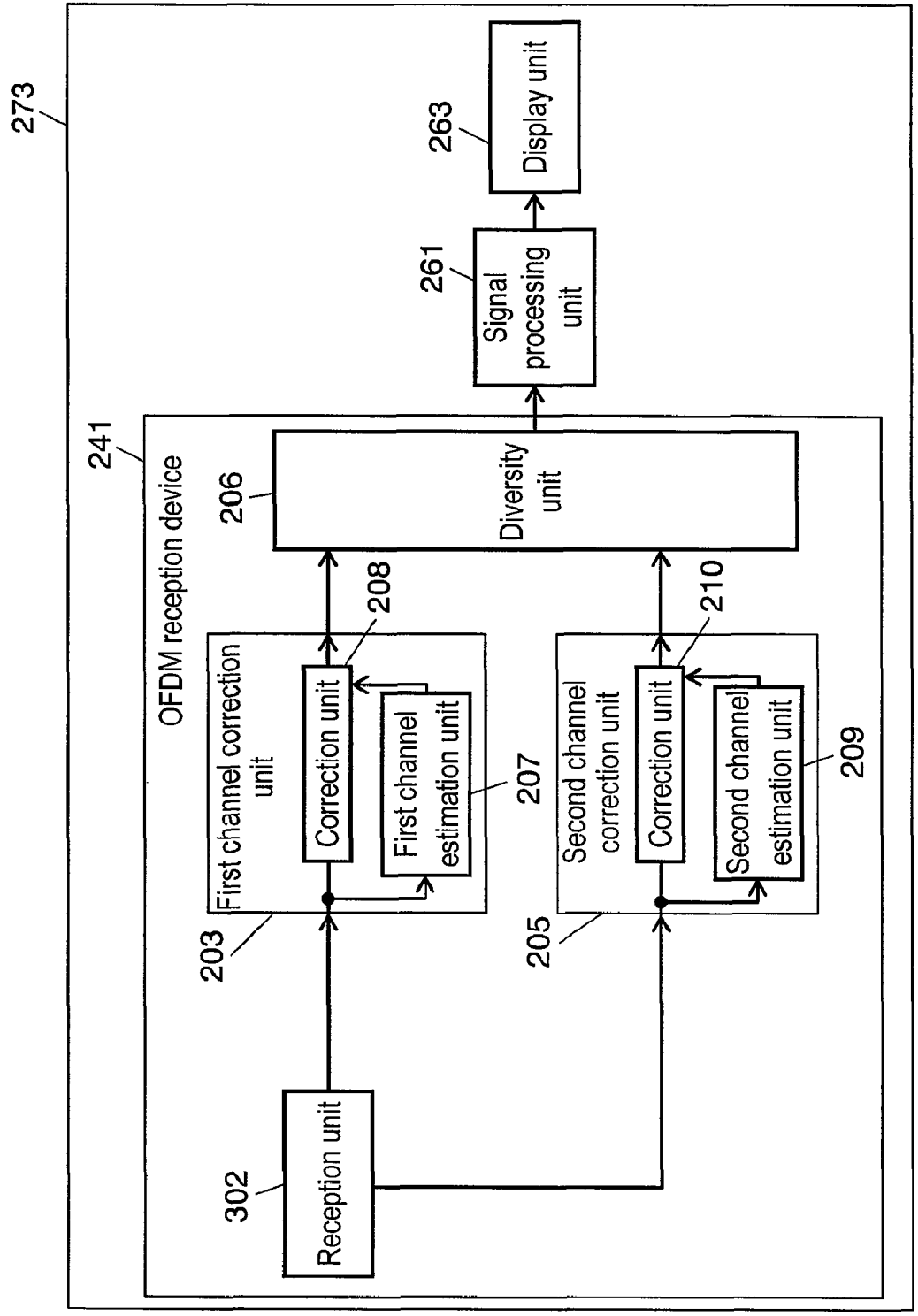
FIG. 13 is a block diagram of an OFDM reception device in accordance with a sixth exemplary embodiment of the present invention.

The sixth exemplary embodiment of the present invention is described hereinafter with reference to FIG. 13. FIG. 13 is a block diagram of OFDM receiver 273 in accordance with the sixth exemplary embodiment of the present invention. Elements similar to those in the fourth exemplary embodiment have the same reference marks. The descriptions of those elements are omitted and the differences are detailed. With reference to FIG. 13, OFDM reception device 241 includes reception unit 302 for receiving an OFDM signal, first channel correction unit 203 connected to reception unit 302, second channel correction unit 205 connected to reception unit 302, and diversity unit 206 connected to first channel correction unit 203 and second channel correction unit 205. Reception unit 302 has a structure and function similar to those of first reception unit 202 of the fourth exemplary embodiment. OFDM receiver 273 incorporating OFDM reception device 241 includes signal processing unit 261 connected to the output side of diversity unit 206 and display unit 263 connected to the output side of signal processing unit 261.

With this structure, first channel correction unit 203 estimates a channel distortion by using pilot signals that are included in reception signals supplied from reception unit 302 and arranged at first symbol intervals. Then, the first channel correction unit corrects the reception signals supplied from reception unit 302. Second channel correction unit 205 estimates a channel distortion by using pilot signals that are included in the reception signals supplied from reception unit 302 and arranged at second symbol intervals shorter than the first intervals. Then, the second channel correction unit corrects the reception signals supplied from reception unit 302.

First channel correction unit 203 estimates the channel distortion by using the first technique, to correct the reception signals supplied from reception unit 302. Second channel correction unit 205 estimates the channel distortion by using the second technique, to correct the reception signals supplied from reception unit 302. Then, in diversity unit 206, the signals supplied from first channel correction unit 203 and second channel correction unit 205 are synthesized or selected based on the quality of each signal. With these operations, multipath tolerance provided by the first technique and fading tolerance provided by the second technique are achieved at the same time.

Unlike OFDM reception device 219 of FIG. 9 in the fourth exemplary embodiment, second reception unit 204 can be omitted in OFDM reception device 241 of FIG. 13 in the sixth exemplary embodiment. Thus, the size and power consumption of the OFDM reception device can further be reduced.

Figure 14:
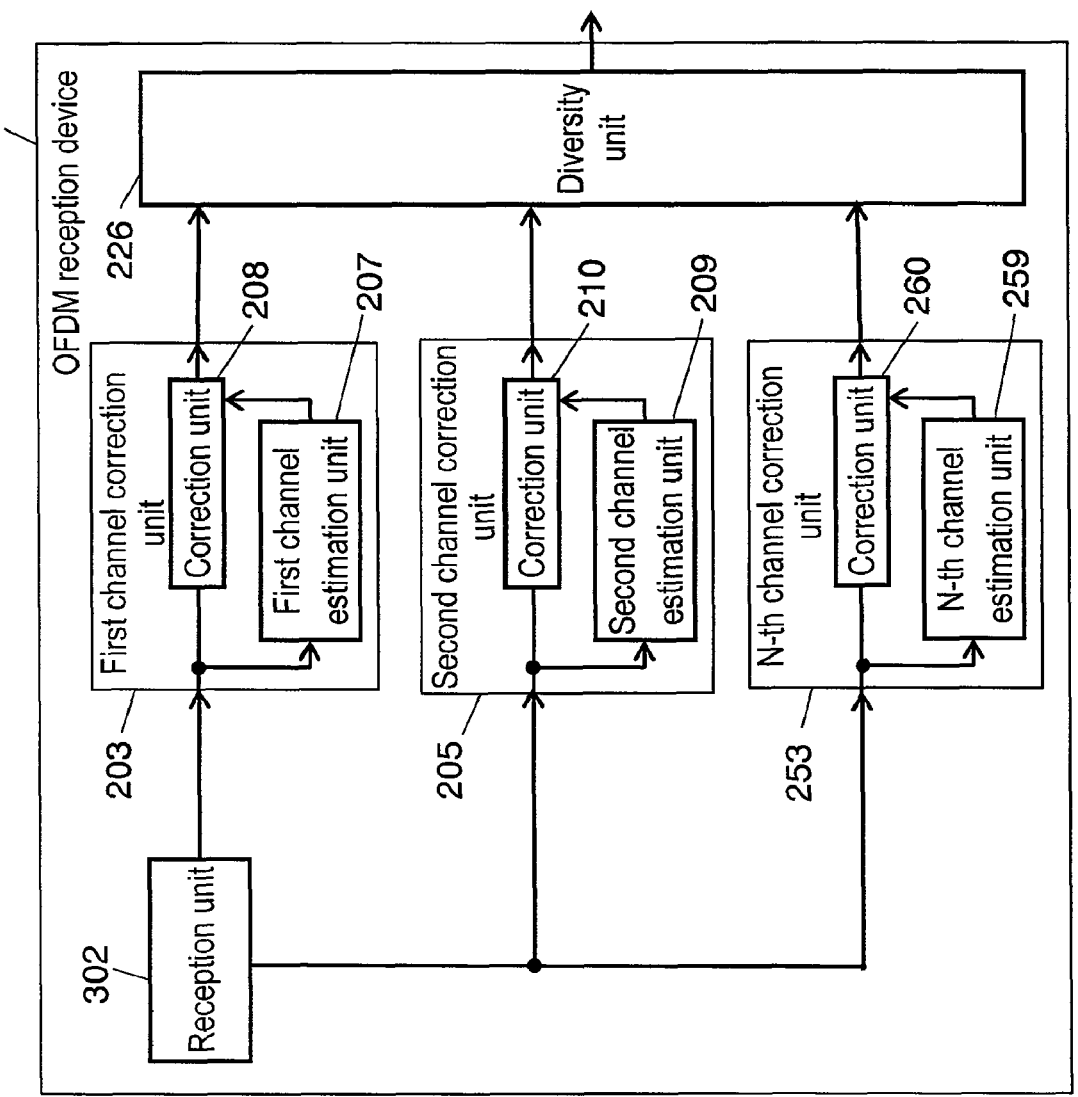
FIG. 14 is a block diagram of another example of the OFDM reception device in accordance with the sixth exemplary embodiment.

In the above descriptions, two of first channel correction unit 203 and second channel correction unit 205 are used as different channel correction units. However, as shown in FIG. 14, an OFDM reception device may be composed of at least three different channel correction units. FIG. 14 is a block diagram of another example of OFDM reception device 254 in accordance with the sixth exemplary embodiment. As shown in the drawing, OFDM reception device 254 includes N channel correction units. The drawing shows only n-th channel correction unit 253 instead of the third unit and thereafter. In this manner, the OFDM reception device includes reception unit 302 and at least three channel correction units connected to reception unit 302. Then, the respective channel correction units make correction by using different channel estimation techniques and diversity unit 206 synthesizes the output therefrom. Thus, the advantage of further improving characteristics can be offered.

INDUSTRIAL APPLICABILITY

An OFDM reception device of the present invention includes a plurality of channel estimation means having different characteristics. Thus, a plurality of characteristics, such as fading performance and multipath tolerance, can be achieved at the same time. The OFDM reception device is particularly useful for an OFDM receiver that must receive signals during moving in various environments, such as a portable terminal and an on-vehicle terminal.

The invention claimed is:

1. An orthogonal frequency division multiplexing (OFDM) reception device comprising:
    a reception unit for receiving an OFDM signal;
    a first channel estimation unit for estimating a channel distortion by using a first signal that is supplied from the reception unit and has a first time interval;
    a second channel estimation unit for estimating a channel distortion by using a second signal that is supplied from the reception unit and has a second time interval shorter than the first time interval;
    a control unit for outputting a control signal based on a reception state of the reception unit;
    a selection unit for selecting and outputting one of a channel estimation signal from the first channel estimation unit and a channel estimation signal from the second channel estimation unit, according to the control signal; and
    a correction unit for correcting a reception signal supplied from the reception unit, according to the channel estimation signal from the selection unit.

2. The OFDM reception device of claim 1, wherein
    the control unit sets a frequency of the OFDM signal to be received by the reception unit,
    when the set frequency of the OFDM signal is lower than a predetermined value, the control unit outputs the control signal for selecting the channel estimation signal from the first channel estimation unit, to the selection unit, and
    when the set frequency of the OFDM signal is equal to or higher than the predetermined value, the control unit supplies the control signal for selecting the channel estimation signal from the second channel estimation unit, to the selection unit.

3. The OFDM reception device of claim 1, further comprising:
    a reception level detection unit for detecting a reception level of the OFDM signal received by the reception unit; and
    a fading frequency estimation unit for estimating a fading frequency of the OFDM signal, according to the reception level of the OFDM signal supplied from the reception level detection unit, and outputting the fading frequency to the control unit,
    wherein, when the fading frequency supplied from the fading frequency estimation unit is lower than a predetermined value, the control unit outputs the control signal for selecting the channel estimation signal from the first channel estimation unit, to the selection unit, and
    when the fading frequency supplied from the fading frequency estimation unit is equal to or higher than the predetermined value, the control unit outputs the control signal for selecting the channel estimation signal from the second channel estimation unit, to the selection unit.

4. The OFDM reception device of claim 1, further comprising:
    a signal quality measurement unit for measuring a signal quality of the OFDM signal received by the reception unit,
    wherein the control unit outputs the control signal for causing the selection unit to select the signal from the other one of the channel estimation units, to the selection unit, when the signal quality supplied from the signal quality measurement unit is lower than a predetermined value.

5. The OFDM reception device of claim 4, wherein the signal quality to be measured by the signal quality measurement unit is a signal level of the OFDM signal received by the reception unit.

6. The OFDM reception device of claim 4, wherein the signal quality to be measured by the signal quality measurement unit is a ratio between a carrier level and a noise level of the OFDM signal received by the reception unit.

7. The OFDM reception device of claim 4, wherein the signal quality to be measured by the signal quality measurement unit is an error rate of the OFDM signal received by the reception unit.

8. The OFDM reception device of claim 1, wherein, when the control unit changes the control signal to be supplied to the selection unit, a state of the control signal to the selection unit is kept for a fixed time period after the change.

9. The OFDM reception device of claim 1, wherein at least three of the channel estimation units are coupled to the reception unit, and the selection unit selects one of the signals from the channel estimation units according to the control signal from the control unit.

10. An orthogonal frequency division multiplexing (OFDM) receiver comprising:
    a reception unit for receiving an OFDM signal;
    a first channel estimation unit for estimating a channel distortion by using a first signal that is supplied from the reception unit and has a first time interval;
    a second channel estimation unit for estimating a channel distortion by using a second signal that is supplied from the reception unit and has a second time interval shorter than the first time interval;
    a control unit for outputting a control signal based on a reception state of the reception unit;
    a selection unit for selecting and outputting one of a channel estimation signal from the first channel estimation unit and a channel estimation signal from the second channel estimation unit, according to the control signal;
    a correction unit for correcting a reception signal supplied from the reception unit, according to the channel estimation signal from the selection unit;
    a signal processing unit coupled to an output side of the correction unit; and
    a display unit coupled to an output side of the signal processing unit.

11. An orthogonal frequency division multiplexing (OFDM) reception device comprising:
    a first reception unit for receiving an OFDM signal;
    a first channel correction unit coupled to the first reception unit;
    a second reception unit for receiving the OFDM signal;
    a second channel correction unit coupled to the second reception unit; and
    a diversity unit coupled to the first channel correction unit and the second channel correction unit,
    wherein the first channel correction unit corrects the reception signal supplied from the first reception unit by estimating a channel distortion using a first signal that is supplied from the first reception unit and has a first time interval, and
    the second channel correction unit corrects the reception signal supplied from the second reception unit by estimating a channel distortion using a second signal that is supplied from the second reception unit and has a second time interval shorter than the first interval.

12. The OFDM reception device of claim 11, wherein
    the OFDM signals include pilot signals,
    the first channel correction unit corrects the reception signal supplied from the first reception unit by estimating the channel distortion using a first signal that is included in the pilot signals and arranged at first symbol intervals, and
    the second channel correction unit corrects the reception signal supplied from the second reception unit by estimating the channel distortion using a second signal that is included in the pilot signals and arranged at second symbol intervals shorter than the first symbol intervals.

13. The OFDM reception device of claim 11, wherein the device includes at least three assemblies each of which includes the reception unit and the channel correction unit serially coupled, and the channel correction units in the respective assemblies correct the reception signals supplied from the reception units by estimating the channel distortions using signals having different time intervals.

14. The OFDM reception device of claim 11, further comprising:
    a control unit;
    an enabling circuit for controlling the second reception unit according to a control signal supplied from the control unit so that operation of the second reception unit is started or stopped;
    a signal selection unit coupled to the first reception unit and the second reception unit, and outputting either one of the reception signal from the first reception unit and the reception signal from the second reception unit to the second channel correction unit, according to the control signal supplied from the control unit;
    an error correction unit coupled to the diversity unit; and
    an error rate measurement unit coupled between the error correction unit and the control unit and measuring an error rate,
    wherein, when the error rate is smaller than a predetermined value, the control unit outputs the control signal for stopping the operation, to the enabling circuit, and outputs the control signal for selecting the reception signal from the first reception unit, to the signal selection unit, and
    when the error rate is equal to or higher than the predetermined value, the control unit outputs the control signal for starting the operation, to the enabling circuit, and outputs the control signal for selecting the reception signal from the second reception unit, to the signal selection unit.

15. The OFDM reception device of claim 11, further comprising:
    a control unit;
    an enabling circuit for controlling the second reception unit according to a control signal supplied from the control unit so that operation of the second reception unit is started or stopped;
    a signal selection unit coupled to the first reception unit and the second reception unit, and outputting either one of the reception signal from the first reception unit and the reception signal from the second reception unit, to the second channel correction unit, according to the control signal supplied from the control unit; and
    a CN ratio (ratio between carrier level and noise level) measurement unit coupled to the diversity unit and measuring a CN ratio,
    wherein, when the CN ratio is larger than a predetermined value, the control unit outputs the control signal for stopping the operation, to the enabling circuit, and outputs the control signal for selecting the reception signal from the first reception unit, to the signal selection unit, and when the CN ratio is equal to or smaller than the predetermined value, the control unit outputs the control signal for starting the operation, to the enabling circuit, and outputs the control signal for selecting the reception signal from the second reception unit, to the signal selection unit.

16. The OFDM reception device of claim 12, further comprising:

a control unit;

an enabling circuit for controlling the second reception unit according to a control signal supplied from the control unit so that operation of the second reception unit is started or stopped;

a signal selection unit coupled to the first reception unit and the second reception unit, and outputting either one of the reception signal from the first reception unit and the reception signal from the second reception unit to the second channel correction unit, according to the control signal supplied from the control unit;

an error correction unit coupled to the diversity unit; and an error rate measurement unit coupled between the error correction unit and the control unit and measuring an error rate, wherein, when the error rate is smaller than a predetermined value, the control unit outputs the control signal for stopping the operation, to the enabling circuit, and outputs the control signal for selecting the reception signal from the first reception unit, to the signal selection unit, and when the error rate is equal to or higher than the predetermined value, the control unit outputs the control signal for starting the operation, to the enabling circuit, and outputs the control signal for selecting the reception signal from the second reception unit, to the signal selection unit.

17. The OFDM reception device of claim 12, further comprising:

a control unit;

an enabling circuit for controlling the second reception unit according to a control signal supplied from the control unit so that operation of the second reception unit is started or stopped;

a signal selection unit coupled to the first reception unit and the second reception unit, and outputting either one of the reception signal from the first reception unit and the reception signal from the second reception unit, to the second channel correction unit, according to the control signal supplied from the control unit; and a CN ratio (ratio between carrier level and noise level) measurement unit coupled to the diversity unit and measuring a CN ratio, wherein, when the CN ratio is larger than a predetermined value, the control unit outputs the control signal for stopping the operation, to the enabling circuit, and outputs the control signal for selecting the reception signal from the first reception unit, to the signal selection unit, and when the CN ratio is equal to or smaller than the predetermined value, the control unit outputs the control signal for starting the operation, to the enabling circuit, and outputs the control signal for selecting the reception signal from the second reception unit, to the signal selection unit.

18. An orthogonal frequency division multiplexing (OFDM) reception device comprising:

a reception unit for receiving an OFDM signal;

a first channel correction unit coupled to the reception unit;

a second channel correction unit coupled to the reception unit; and a diversity unit coupled to the first channel correction unit and the second channel correction unit, wherein the first channel correction unit corrects the reception signal supplied from the reception unit by estimating a channel distortion using a first signal that is supplied from the reception unit and has a first time interval, and the second channel correction unit corrects the reception signal supplied from the reception unit by estimating a channel distortion using a second signal that is supplied from the reception unit and has a second time interval shorter than the first time interval.

19. The OFDM reception device of claim 18, wherein the OFDM signal includes pilot signals, the first channel correction unit corrects the reception signal supplied from the reception unit by estimating the channel distortion using a first signal that is included in the pilot signals and arranged at first symbol intervals, and the second channel correction unit corrects the reception signal supplied from the reception unit by estimating the channel distortion using a second signal that is included in the pilot signals and arranged at second symbol intervals shorter than the first symbol intervals.

20. The OFDM reception device of claim 18, wherein at least three of the channel correction units are provided, and the respective channel correction units correct the reception signal supplied from the reception unit by estimating the channel distortions using the signal supplied from the reception unit and having different time intervals.

21. An orthogonal frequency division multiplexing (OFDM) receiver comprising:

a first reception unit for receiving an OFDM signal;

a first channel correction unit coupled to the first reception unit;

a second reception unit for receiving a further OFDM signal;

a second channel correction unit coupled to the second reception unit;

a diversity unit coupled to the first channel correction unit and the second channel correction unit;

a signal processing unit coupled to an output side of the diversity unit; and a display unit coupled to an output side of the signal processing unit, wherein the first channel correction unit corrects a reception signal supplied from the first reception unit by estimating a channel distortion using a signal that is supplied from the first reception unit and has a first time interval, and the second channel correction unit corrects a reception signal supplied from the second reception unit by estimating a channel distortion using a signal that is supplied from the second reception unit and has a second time interval shorter than the first interval.

22. An orthogonal frequency division multiplexing (OFDM) receiver comprising:

a reception unit for receiving an OFDM signal;

a first channel correction unit coupled to the reception unit;

a second channel correction unit coupled to the reception unit;

a diversity unit coupled to the first channel correction unit and the second channel correction unit;

a signal processing unit coupled to an output side of the diversity unit; and a display unit coupled to an output side of the signal processing unit, wherein the first channel correction unit corrects a reception signal supplied from the reception unit by estimating a channel distortion using a signal that is supplied from the reception unit and has a first time interval, and the second channel correction unit corrects a reception signal supplied from the reception unit by estimating a channel distortion using a signal that is supplied from the reception unit and has a second time interval shorter than the first interval.

* * * * *